Patented Oct. 15, 1940

2,218,362

UNITED STATES PATENT OFFICE 2,218,362

RUBBERLIKE INTERPOLYMERS OF BUTADIENE AND METHYL METHACRYLATE AND PROCESS FOR MAKING SAME

Howard W. Starkweather, New Castle County, and Arnold M. Collins, Wilmington, Del., assignors to E. I. du Pont de Nemours & Company, Wilmington, Del., a corporation of Delaware No Drawing. Application March 9, 1939, Serial No. 260,758

11 Claims. (Cl. 260—84)

This invention relates to the preparation of rubberlike products. More particularly, it relates to the preparation of rubberlike products by the polymerization of mixtures of unsaturated compounds.

It has been disclosed in British Patent No. 360,822 that butadiene and certain acrylic acid esters, when dispersed in a suitable emulsifying solution, may be polymerized by heat to form products resembling natural rubber in many of their properties. Since, however, the polymerization is slow and great difficulty is experienced in obtaining even passable yields of the rubberlike products, and since articles made from these polymers are deficient in certain important physical properties such as tensile strength and abrasion resistance, products of this type have received very little practical attention. On the other hand, British Patent No. 401,653 describes polymerization of methylmethacrylate in the presence of a wide variety of other polymerizable materials and while it mentions, among these, butadiene and states further that the polymerizations can be conducted in a watery dispersion, it does not anywhere suggest the production of rubberlike materials and it is quite obvious from the description of the materials that the patent is intended to cover that the patentees never even contemplated the producton of rubberlike materials.

It is an object of this invention to prepare new polymerization products. A more specific object of the invention is to prepare rubberlike materials from butadiene and polymerizable esters of unsaturated acids. A further object is to prepare rubberlike materials having improved physical properties by polymerization of mixtures of butadiene and polymerizable esters of unsaturated acids. A still further object is to develop a more rapid and efficient method for making such rubberlike products. Other objects will appear hereinafter.

These objects are accomplished according to the present invention by polymerizing a mixture of butadiene and the methyl ester of alpha methyl acrylic acid (hereinafter called "methyl methacrylate") in which from about 15% to about 50% of the weight of the two polymerizable materials is methyl methacrylate. The polymerization is conducted while the mixture is dispersed in an aqueous medium.

The following examples illustrate how the invention may be carried out. It should be understood, however, that these examples are intended to be illustrative only and are not intended to limit the scope of the invention. The term "parts" whenever hereinafter used signifies "parts by weight."

Example 1

Forty parts of butadiene (92% pure), 20 parts of methyl methacrylate, and 76 parts of an aqueous solution containing 2.3 parts of oleoamidoethyl dimethylamine hydrochloride,

$C_{17}H_{33}$—$CONHC_2H_4N(CH_3)_2 \cdot HCl$ and 0.24 part of acetic acid were introduced into a glass tube of such a size that a vapor space of one third remained. The tube was then sealed and rotated about an axis perpendicular to its length in a bath at 60° C. The butadiene and methyl methacrylate dispersed readily in the solution of the substituted ammonium salt. After 160 hours, the tube was opened and the thick dispersion of polymer was thinned with water and coagulated by adding sodium chloride and ethyl alcohol. The coagulum was washed with warm water and then milled and dried on a rubber mill (with the addition of 0.22 part of phenyl beta-naphthylamine) to form a smooth sheet. The yield was 90% of the total quantity of butadiene and methyl methacrylate used.

Into 100 parts of this product were incorporated by milling:

| | Parts |
|---|---|
| Carbon black (channel black) | 50 |
| Zinc oxide | 5 |
| Stearic acid | 2 |
| Sulfur | 2 |
| Mercaptobenzothiazol | 1.25 | and the resulting compound was cured for 30 minutes at 141° C. The product was very strong and elastic, having a tensile strength of 3125 lbs. per sq. in. and an elongation at break of 400%.

Example 2

Sixty-nine grams of butadiene and 31 parts of methyl methacrylate were emulsified in 125 parts of an aqueous solution containing 2.5 parts of the dimethyl sulfate addition product of cetyl dimethylaminobenzoate,

$C_{16}H_{31}O(CO)C_6H_4N(CH_3)_3SO_4CH_3$ and 0.4 part of acetic acid and heated for 120 hrs. at 60° C. in a steel autoclave half full. The resulting polymer dispersion was coagulated by making it alkaline and maintaining it at 60° C. The coagulum was washed, dried, and treated with phenyl betanaphthylamine as in Example 1, giving an 87% yield of a polymer which, when compounded as in Example 1 (except that 10 parts of zinc oxide and 1 part of the accelerator were used) and cured for 60 minutes at 141° C. gave a very strong and elastic product which had a tensile strength of 3500 lbs. per sq. in. and an elongation at break of 265%.

The ratio of butadiene to methyl methacrylate has an important influence upon the properties of the polymerization product. In general, as the proportion of methacrylate is increased, the strength of the resulting product increases. Thus, with less than about 15% by weight of methacrylate, the product is not strong enough for general use in place of natural rubber, while, with more than about 50% of methacrylate, the product, although very strong, is in many cases too stiff and not elastic enough to be substituted directly for natural rubber. The most generally useful rubberlike products are made from mixtures in which about 30% to about 50% by weight of the total polymerizable material is methyl methacrylate. In general, the products most suitable for such application as tire treads are made with about 40% of methyl methacrylate.

As emulsifying agents any substances may be used which when dissolved in water are capable of giving a permanent dispersion in the water of the mixture of butadiene and methyl methacrylate, although, since slightly acid dispersions are often used, the most suitable emulsifying agents are those which give stable acid dispersions and which do not promote the hydrolysis of the ester to an undesirable extent. It has been found that substituted ammonium or sulfonium salts containing long chain (12 or more carbon atoms) hydrocarbon groups are particularly suitable. Examples of such agents in addition to those given in Examples 1 and 2 are:

Cetyl trimethyl ammonium bromide
$C_{16}H_{33}(CH_3)_3N—Br$
Cetyl methyl piperidinium methyl sulfate
$C_{16}H_{33}(CH_3)(C_5H_{10}=)N—O—SO_2—O—CH_3$
Oleoamidoethyl diethylamine acetate
$C_{17}H_{33}CONHC_2H_4NH(C_2H_5)_2—OCOCH_3$
N—Stearyl betaine
$C_{18}H_{37}(CH_3)_2 N—CH_2—CO—O$ C—Cetyl betaine
$C_{16}H_{33}CH—CO—O—N(CH_3)_3$ Parastearamidophenyl trimethylamine methyl sulfate
$C_{17}H_{35}CONHC_6H_4N(CH_3)_3—O—SO_2—O—CH_3$ It will be seen that all these agents contain pentavalent nitrogen atoms one valence of which is attached to a negative, ionizable, salt-forming radical. This may be bromide, chloride, acetate $(CH_3COO—)$, methyl sulfate $(CH_3—O—SO_2—O—)$ toluene sulfonate $(C_7H_7SO_3—)$ or the carboxyl group of a betaine. The long hydrocarbon chain may be attached directly to the nitrogen or may form part of a more complicated group. An example of a suitable sulfonium compound is cetyl dimethyl sulfonium methyl sulfate. Another type of agent which also gives good results, particularly at pH9, is isopropyl naphthalene sodium sulfonate.

A 2% or 3% solution of the agents in water is usually suitable for forming a good dispersion but considerably stronger or weaker solutions, for example 0.2% to 10%, may also be used. The polymerization is conveniently carried out in a slightly acid dispersion as in the examples but it should be understood that the dispersion may be either alkaline, neutral, or acid, provided that conditions are not such that the dispersion is interfered with or coagulation induced or that the methyl methacrylate is hydrolyzed to an undesirable extent. Catalysts of polymerization may be added, for example hydrogen peroxide, benzoyl peroxide, and ammonium persulfate and, in general, the polymerization may be varied according to well known methods.

The ratio of the dispersed phase (butadiene and methyl methacrylate) to water may be widely varied. It is preferable that the amount, by weight, of water should be from about 100% to about 200% of the dispersed phase. Much more concentrated dispersions are so thick as to be difficult to agitate and may even suffer inversion. More dilute dispersions require uneconomically large reaction vessels.

The polymerization may be carried out at any temperature from about 20° C. to about 100° C. or above. It has been found, however, that temperatures in the range between about 50° C. and about 70° C. are, in general, the most suitable. At lower temperatures the polymerization is usually too slow while at higher temperatures more elaborate equipment is required to withstand the high pressure and certain properties of the product are adversely effected.

The polymer dispersions may be coagulated by any of the known methods applicable to dispersions made with the particular dispersing agent employed. Thus, some may be coagulated as in Example 2 by making them alkaline and warming. Ethyl alcohol is generally applicable to substituted ammonium salt dispersions. A more economical method is that disclosed in the copending application of Calcott and Youker, Serial No. 181,602, filed December 24, 1937, a preferred embodiment of which (see Example 2) consists of first adding a saturated solution of sodium chloride and then adding a 7% solution of normal butyl alcohol in water. In this way a rapid and complete coagulation is obtained with the use of only a small amount of alcohol. Another application of this method is used in Example 1 above. Coagulation may also be very advantageously brought about by the method disclosed in the copending application of Calcott and Starkweather, Serial No. 107,360, filed October 24, 1936. According to a preferred form of this method, an internally cooled drum, part of which dips into the dispersion, is rotated in such a manner that a thin layer of the dispersion is frozen thereon and maintained at the low temperature out of contact with the unfrozen dispersion for a time long enough to cause complete coagulation. The frozen layer is then removed from the drum and warmed. A continuous layer of coagulum results, which, because of its physical form, is readily washed and dried.

The compounding of the products of this invention in general follows the principles used for natural rubber. Thus, the presence of an antioxidant of the class effective for natural rubber is important, especially since the synthetic materials, unlike the rubber, contain no natural antioxidant. The antioxidant is advantageously added in the form of a dispersion to the polymer dispersion before coagulation. Sulfur or its equivalent is used to bring about vulcanization, along with an organic vulcanization accelerator and auxiliary agents such as zinc oxide and stearic acid. In general, all of the filling and reinforcing agents and pigments used for rubber may be used here. Carbon black is particularly useful for reinforcing. Other agents known in the rubber art for softening, stiffening, reodorizing, or for producing or altering other special properties may also be added.

The products of the present invention may be used in the rubber art for practically all purposes for which natural rubber is used. Moreover, when suitably compounded and cured, they are much superior to natural rubber in several properties, notably resistance to abrasion and to the swelling action of oils and solvents. These products are therefore particularly suitable for making articles which are subjected in service to these influences. Examples of such applications are tire treads, gaskets, tubing, diaphragms and similar articles used in contact with oils and solvents.

Both the products of the present invention and the process by which they are made are greatly superior to those of the British Patent No. 360,822 referred to above. Examples 3 and 4 of this patent, involving the polymerization with butadiene of methyl acrylate and butyl acrylate, respectively, have been carefully repeated, with the results that yields of 18% and 50%, respectively, were obtained in 113 hours at 60° C., which is considerably longer than the polymerization times given in the patent. When compounded and cured as in Example 2 hereof, the tensile strengths were 2175 and 1000 lbs. per sq. in. The elongations were 190% and 160%, and the abrasions were 0.120 and 0.315, respectively. These abrasion figures represent the amounts of material abraded under the test conditions described by Lambourne (Trans. Inst. Rub. Ind. 4, 212 (1928)), using 16% slip. The cured product of Example 2 hereof gave 0.070 by this method. Numerous attempts have been made to improve the yield, tensile strength, abrasion resistance, etc. of the methyl acrylate and butyl acrylate products described in the British patent by prolonging the reaction time, using other dispersing agents and butadiene preparations of greater purity and made by other methods, and by polymerizing in the presence of carbon tetrachloride, which as shown in the copending application of Habgood and Morgan, Serial No. 241,668, filed Nov. 21, 1938, accelerates the polymerization of the butadiene-methyl methacrylate system. In no case did these experiments yield results approaching those obtained according to the present invention. The difference between the products of the present invention and those of British Patent No. 401,653 is perhaps even more striking in that the products of the patent are resinous in nature whereas those prepared as disclosed herein are rubberlike.

The superiority of methyl methacrylate over the acrylates for forming rubberlike products with butadiene is entirely unexpected. In fact, the statements in the literature indicate that methyl methacrylate would be much inferior for this purpose. Thus, Neher (Ind. Eng. Chem. 28, 267 (1936)) states that, "acrylates polymerize much faster and therefore more violently than the corresponding methacrylates," and that "whereas polymethyl acrylate is a rather soft, elastic, rubberlike substance, polymethyl methacrylate is a hard, tough mass which can be sawed, carved, or worked on a lathe with ease." These statements would certainly lead one away from the use of methyl methacrylate for the rapid production of rubberlike materials.

The above description and examples are intended to be illustrative only. Any modification of or variation therefrom which conforms to the spirit of the invention is intended to be included within the scope of the claims.

It is claimed:

1. The process for making rubberlike materials which comprises polymerizing, while it is dispersed in an aqueous medium, a mixture of butadiene and methyl methacrylate, in which from about 15% to about 50% of the weight of the two polymerizable materials is methyl methacrylate.

2. The process for making rubberlike materials which comprises dispersing in water containing a small amount of emulsifying agent a mixture of butadiene and methyl methacrylate in which from about 15% to about 50% of the weight of the two polymerizable materials is methyl methacrylate, and then polymerizing the mixture so dispersed.

3. The process of claim 2, further characterized in that from about 30% to about 50% of the weight of the two polymerizable materials is methyl methacrylate.

4. The process of claim 2, further characterized in that about 40% of the weight of the two polymerizable materials is methyl methacrylate.

5. The process of claim 2, further characterized in that the polymer is coagulated, washed, dried, compounded, and cured.

6. The process of claim 2, further characterized in that from about 30% to about 50% of the weight of the two polymerizable materials is methyl methacrylate and in that the polymer is coagulated, washed, dried, compounded, and cured.

7. A polymer obtained by the process of claim 1.

8. A polymer obtained by dispersing in water in the presence of an emulsifying agent a mixture of butadiene and methyl methacrylate in which from about 30% to about 50% of the weight of the two polymerizable materials is methyl methacrylate and then polymerizing the mixture while so dispersed.

9. A polymer obtained by dispersing in water in the presence of an emulsifying agent a mixture of butadiene and methyl methacrylate in which from about 30% to about 50% of the weight of the two polymerizable materials is methyl methacrylate and then polymerizing the mixture while so dispersed, and thereafter coagulating the polymer, washing, drying, compounding, and curing it.

10. A polymer obtained by compounding and curing a polymer obtained by the process of claim 1.

11. A polymer obtained by the process of claim 2, further characterized in that it is made from a mixture of butadiene and methyl methacrylate in which about 40% of the weight of the two polymerizable materials is methyl methacrylate.

HOWARD W. STARKWEATHER.
ARNOLD M. COLLINS.